March 15, 1932.  A. TROVATON  1,849,256
WEIGHING AND SACKING MACHINE
Filed Sept. 21, 1928  4 Sheets-Sheet 1

Andrew Trovaton, INVENTOR,

BY

Siggers & Adams
ATTORNEYS

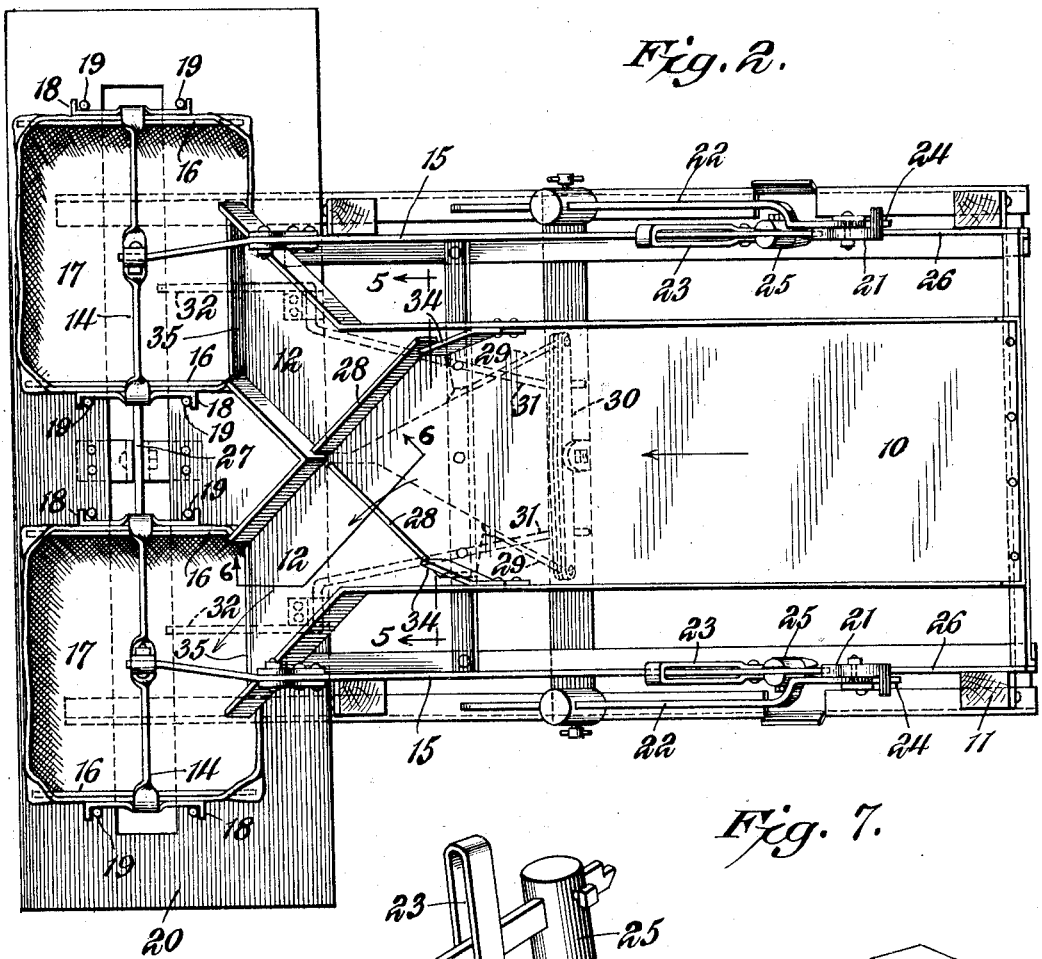
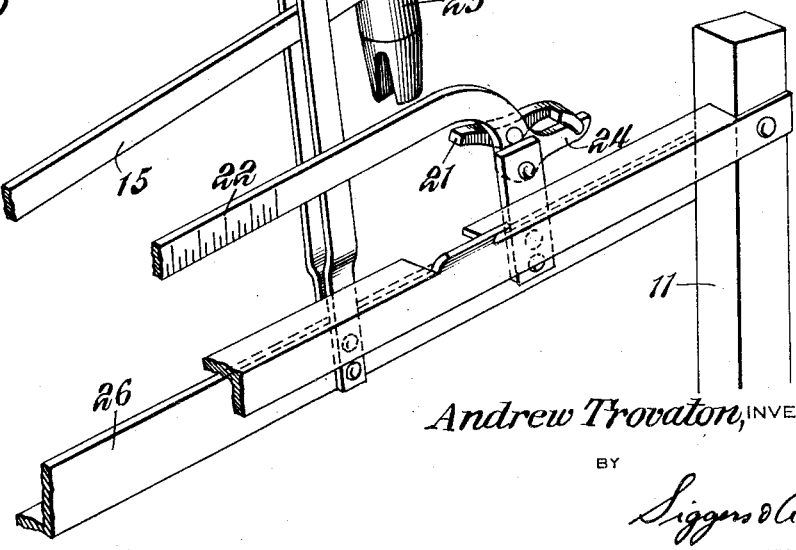

March 15, 1932. A. TROVATON 1,849,256
WEIGHING AND SACKING MACHINE
Filed Sept. 21, 1928  4 Sheets-Sheet 3
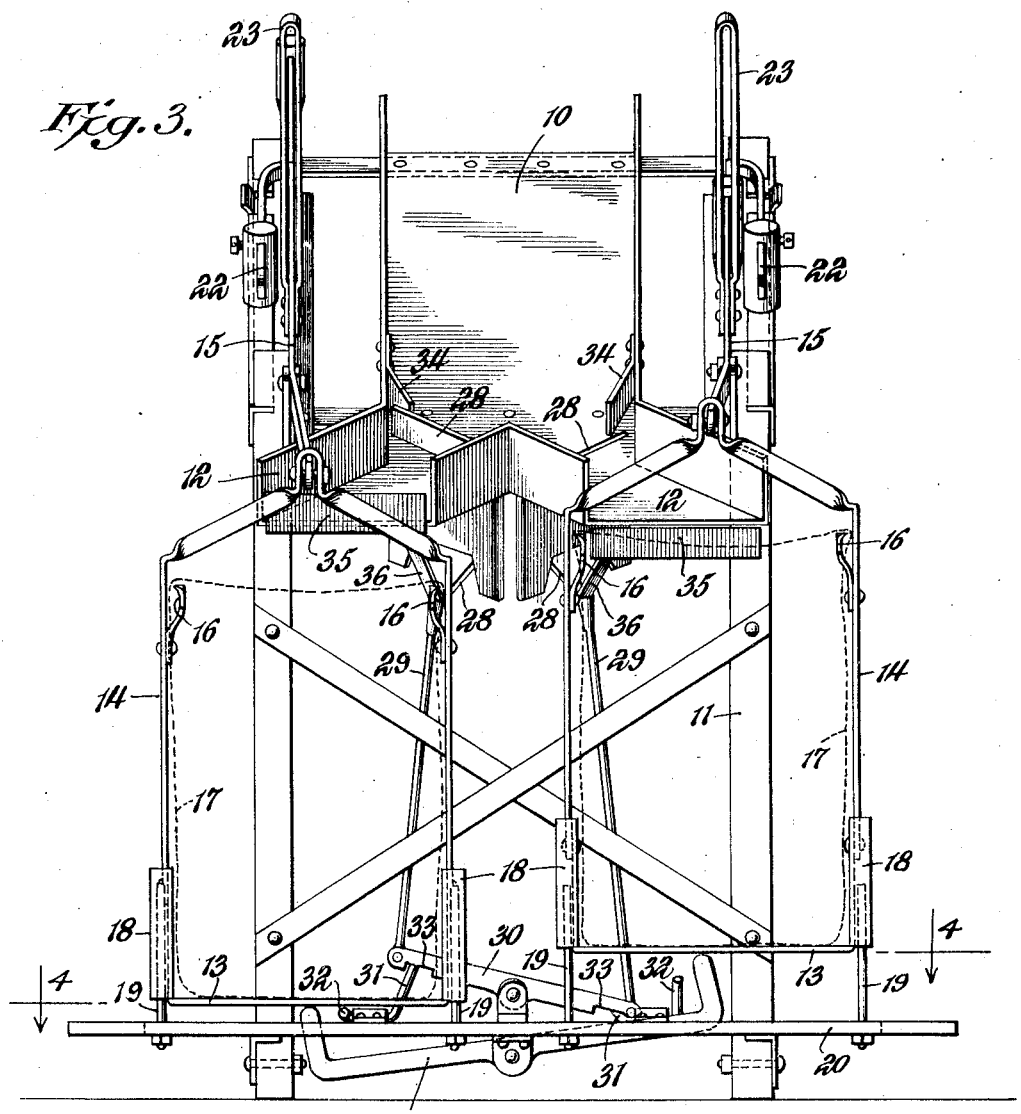
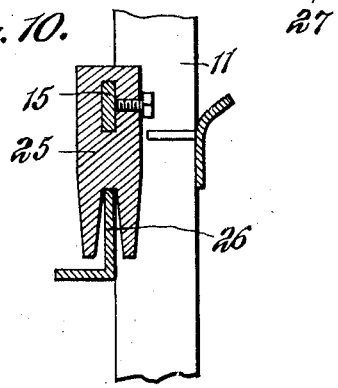
Andrew Trovaton, INVENTOR,
BY
Siggers & Adams,
ATTORNEYS

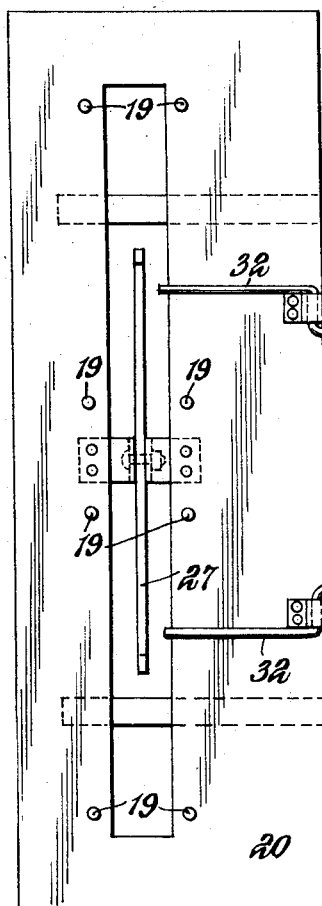
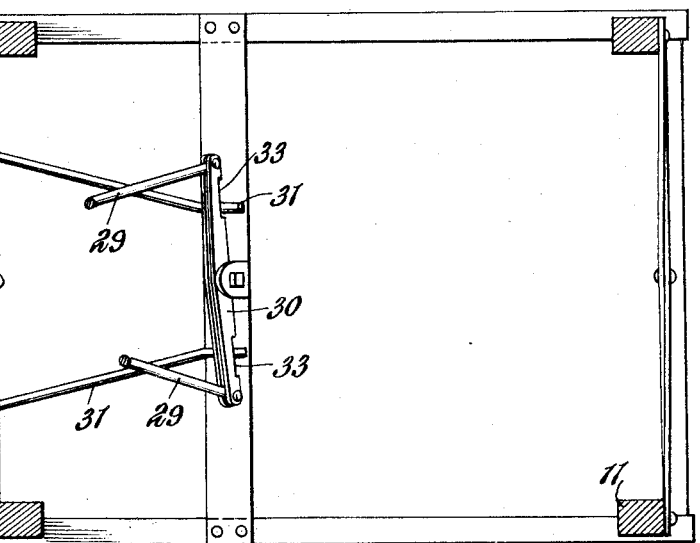
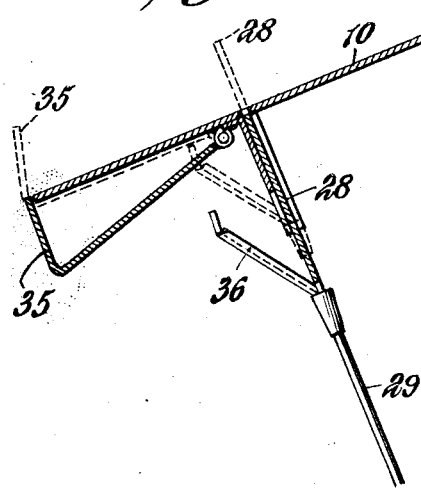

Patented Mar. 15, 1932

1,849,256

UNITED STATES PATENT OFFICE

ANDREW TROVATON, OF McINTOSH, MINNESOTA

WEIGHING AND SACKING MACHINE

Application filed September 21, 1928. Serial No. 307,478.

This invention relates to automatic sacking and weighing machines and aims, among other objects, to provide improved and accurate weighing mechanism in combination with improved means to control the flow for the material to the bags. More specifically stated, it aims to provide an improved machine eminently adapted to sack potatoes at storage warehouses and the like, although it is understood that the invention applies to machines for weighing and sacking other materials.

Other aims and advantages of the invention will appear in the specification, considered in connection with the illustrative embodiment thereof, shown in the accompanying drawings, wherein:

Fig. 2 is a top plan view;

Fig. 3 is a front end elevation;

Fig. 4 is a sectional view taken on the line 4—4 of Fig. 3, parts being omitted;

Fig. 5 is a fragmentary sectional view taken on the line 5—5 of Fig. 2;

Fig. 6 is a fragmentary sectional view taken on the line 6—6 of Fig. 2;

Fig. 7 is a fragmentary perspective view on an enlarged scale, of some of the weighing mechanism;

Fig. 10 is a fragmentary sectional view, on an enlarged scale, taken on the line 10—10 of Fig. 1.

The more or less complex bagging and weighing machines for tubers and the like, now generally employed, are subject to some very serious objections, not merely because of their delicate and intricate mechanisms, but on account of their failure to provide accurate, sturdy and dependable means to weigh the material and cut off the flow thereof at the proper time to avoid excessive overweights. Moreover, potatoes or tubers often become jammed in the ordinary swinging gates or valves preventing the mechanism from functioning properly and also badly bruising or crushing the potatoes. Furthermore, some of the machines permit the potatoes to fall so fast into the bags that they are badly damaged by being bruised against each other. Also, they often wreck or break the valve operating mechanism and the supporting platforms.

This invention is primarily intended to obviate the foregoing difficulties by the provision of improved, yet relatively simple, mechanism that is both practical and efficient in operation and insures that the material is accurately weighed and bagged without being unduly bruised or damaged.

Referring specifically to the embodiment of the invention shown in the accompanying drawings, the improved weighing and bagging mechanism is there shown as being associated with an inclined chute 10, supported on a suitable openwork frame 11, and having branches 12 at its discharge end, the arrangement being such that the receiving end of the chute may be placed adjacent to a source of supply of potatoes or other material acting from a sorter or the like and so that the potatoes will not be materially injured or bruised in their descent.

Figure 9:
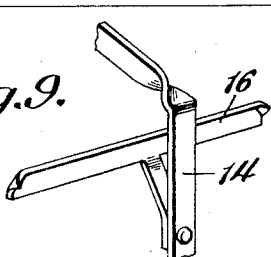
Fig. 9 is a fragmentary perspective view of a bag supporting arm.

Herein, a pair of bag supports or platforms 13 are mounted below the branches 12 and are shown as having suspending bails 14 preferably made of spring steel or the like so that they can spring inwardly and accommodate bags of different sizes. Each bail is shown as being suspended from a pivoted weighing lever 15 mounted above the supporting frame at the opposite sides of the chute. Also, the bails are conveniently provided with bag holding arms 16 (Figs. 1 and 9) arranged to penetrate the bags 17 and hold them open under the discharge ends of the respective branches 12. Further, the platforms are preferably guided to move or fall vertically by means of guiding plates or channels 18, either secured to or formed as a part of the platform plates and co-operating with upstanding guiding pins or arms 19, which are secured to a stationary platform 20 on the supporting frame.

Figure 1:
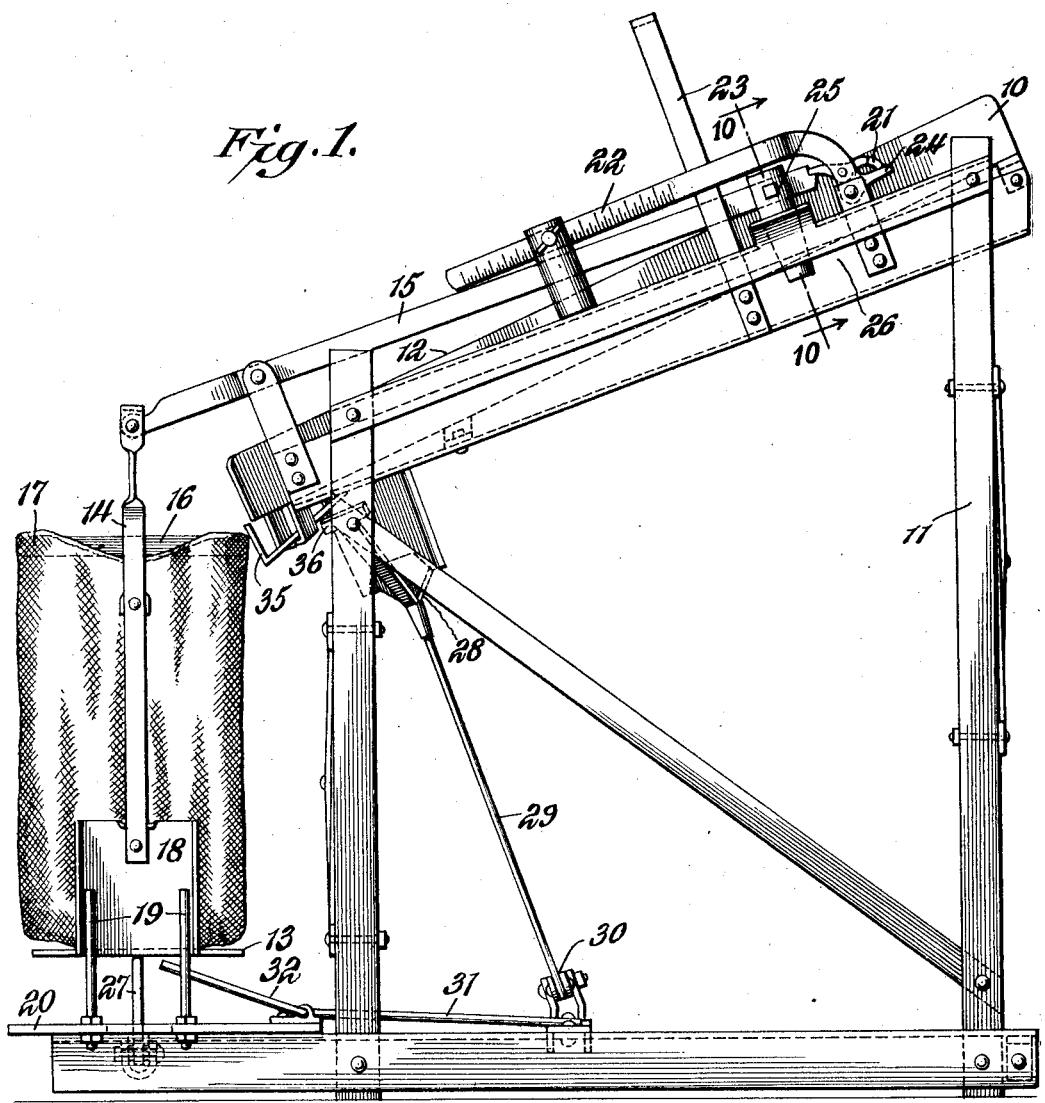
Fig. 1 is a side elevation of the machine.
Figure 8:
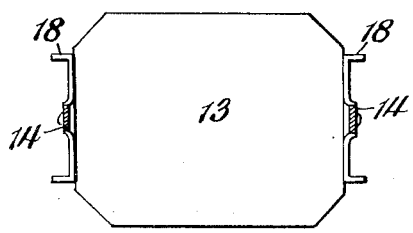
Fig. 8 is a top plan view of a bag platform.

As will be observed by reference to Figs. 1, 2 and 3, the arrangement is such that potatoes or other more or less bulky material are discharged alternately through the branches of the chute to fill the respective bags, the idea being to cut off the flow after a bag is filled to a predetermined weight. It is highly desirable that the weight shall be quite accurate and to avoid excessive overweights, especially at warehouses where large quantities of materials are bagged. Herein, the weighing mechanisms for the bags are entirely independent of each other.

Referring to Fig. 1, the weighing levers 15 are shown as terminating in notched ends and are adapted to be locked down by a pivoted counterweighted latch 21 on a pivoted scale beam 22, the idea being to permit the weighing levers to swing below the latches and automatically lock themselves when they swing downwardly and be released from locking engagement when the scale beams rise. Herein, the weighing levers 15 swing in suitable U-shaped guides 23 secured to the supporting frame so that they are constrained to move in vertical planes and thus insure engagement with the latches. The counterweighted ends of the latches are preferably arranged to act against integral projections 24 at the rear ends of the scale beams. Stop members in the form of notched counterbalancing weights 25 are adjustably secured on the levers 15 to swing them to their locking positions. The notched ends thereof (see Fig. 7) are adapted to straddle a fixed member such as the flange 26 on the supporting frame. These combined weight and stop members are also adapted to be moved slightly to effect the proper balancing of the scales.

It will be understood that, after one of the trip latches is released by the weight in a filled bag, the weighing lever will permit the platform to descend (see Fig. 3). When the platforms descend they are utilized to operate gate and cut-off mechanism later to be described. Under the platforms, there is provided a pivoted beam 27 mounted on the stationary platform 20 and adapted to work see-saw fashion, this beam being sufficiently strong to support two filled bags in case the operator fails to remove one before the other is filled. Thus, it serves to relieve the mechanism of undue strains.

Herein, the pivoted beam is substantially U-shaped and its legs are adapted to project through an open slot in the platform 20. There is only a slight amount of lost motion permitted between the bag platforms and this pivoted beam to avoid the possibility of undue shock to the mechanism when a bag platform is released by the tripping mechanism.

It is, of course, necessary to provide automatic means to divert the flow of material from one branch of the chute to the other when one of the bags is filled. To this end, there is provided a pair of under-shot, under-slung switch gates or valves 28 adapted to be projected through the bottom of the chute at the mouths of the two branches (Fig. 3). It is highly desirable that these switch gates shall be projected upwardly rather than downwardly to swing sidewise to cut off the flow of potatoes or other coarse material, otherwise the potatoes or the like would be bruised or damaged by being caught under the gate or at the sides. Also the operating mechanism would be interfered with.

Herein, these gates are secured to rods or operating stems 29 pivoted to the opposite ends of a rocker bar 30 which is adapted to be moved incident to the descent of either one of the bag platforms. There is shown a pair of pivoted rods 31 having bent arms 32 below the respective platforms arranged to coact with the rocker bar 30 which preferably has notches 32 on its lower edge. It will thus be seen that the mechanism is constructed and arranged to raise the switch gate in that branch of the chute through which a bag has been filled and the switch gate in the other chute branch is lowered. To aid in diverting material from one spout to the other, there are shown diverting wings or plates 34 secured to the side walls of the chute.

In order to cut off the flow of material to a bag immediately after the weighing mechanism has tripped the latch and the platform descends, it is desirable to provide cut-off means at or near the ends of the chute branches; otherwise, any material that may be rolling down the branches below a switch plate would fall into the weighed bag. To this ends, a pair of pivotally mounted cut-off gates 35 are shown as being arranged at the discharge ends of the chute branches and are so mounted that they are actuated to close or rise with a snap, action incident to the rising movement of the respective switch gates.

Herein, the cut-off gates are pivoted to the bottom walls of the branches 12 and the operating stem or rod of the switch gates have angular projecting arms 36 arranged to strike the cut-off gates near their pivots immediately after the switch gates have been initially raised. In Figure 6, it will be seen that only a small movement of the operating stems or of the switch gates will cause the cut-off gates to be fully closed. This arrangement is also such that the upward swinging cut-off gates will not injure or bruise potatoes or other vegetables.

From the foregoing description it is apparent that the improved weighing and bagging mechanism is well adapted for handling potatoes and other vegetables at storage warehouses. Moreover, it will be seen that the scale mechanisms for the bags operate entirely independently of each other, thus being free to measure the correct weight without any inter-connected link and lever mechanism which affect the accuracy of the scales. Further, the switch gates and cut-offs are so arranged that they are operated positively without injury to the material and also without being choked up by the material. Further, it is practically impossible for any of the material to jam any part of the operating mechanism arranged under and at the sides of the chute.

It is to be understood that the terms "bagging" or "sacking" used in the description and claims should be considered whenever possible as applying to the filling of ordinary containers such as baskets, boxes, barrels and shipping crates.

Obviously, the present invention is not restricted to the particular embodiment thereof herein shown and described. Moreover, it is not indispensable that all the features of the invention be used conjointly, since they may be employed advantageously in various combinations and sub-combinations.

What is claimed is:—

1. An automatic weighing and bagging machine comprising, in combination, an inclined chute having a pair of branches at the discharge end; suspended platforms below the branches; weighing mechanism connected to said platforms; locking means associated with the weighing mechanism arranged to be released automatically thereby and permit the respective platforms to fall; cut-off gates associated with the chute branches; and gate closing means operable by the descending platforms to close the respective gates with a snap action after the scale mechanism has released the locking means.

2. An automatic weighing and bagging machine comprising, in combination, an inclined chute having a pair of branches; movable supporting platforms below the discharge ends of the branches; material diverting mechanism operable by the platforms; automatic weighing mechanism associated with each bag platform, said weighing mechanisms being independent of each other; and movable locking means associated with the weighing mechanism arranged to be automatically released to permit the platforms to move and actuate the material diverting means.

3. An automatic weighing and bagging machine comprising, in combination, an inclined chute having a pair of branches at the discharge end; bag supporting platforms below the branches; weighing levers suspending the bag platforms; weighing mechanism associated with the weighing levers at the sides of the chute; locking means for the weighing levers arranged to be released automatically when the desired weight is discharged into the bags; switch gates associated with the chute and adapted to be projected upwardly therethrough; switch gate operating mechanism coacting with the bag supporting platforms automatically to raise said switch gates when the platforms descend; and a pivoted beam below the bag supporting platforms arranged to relieve the operating mechanism of excess weights on both platforms.

4. In a weighing and bagging machine of the character described, an inclined chute having a pair of branches; movable supports below the branches; weighing mechanism for the supports; means to raise or balance one support when the other support descends; locking means associated with the weighing mechanism adapted to release a support carrying a weighed bag; cut-off gates adjacent to the ends of the chute branches and arranged to be closed by upward movement; and operating means to close said cut-off gates with substantially a snap action incident to the descent of the platforms.

5. In an automatic weighing and container filling machine of the class described, a chute having inclined discharge branches; a pair of container supporting platforms below the respective branches; weighing mechanism suspending said platforms; locking means associated with the weighing mechanism arranged automatically to release one of the platforms when its container is filled; cut-off gates for the chute branches pivotally supported thereunder and adapted to rise adjacent to the ends thereof; and means operable by the descending platforms to close the respective cut-off gates with a snap action.

6. In an automatic weighing and bagging machine of the character described, an inclined chute having a pair of branches at the discharge end; bag supporting platforms below the branches; weighing mechanism suspending the bag supporting platforms including releasable locking means permitting one bag platform to descend automatically when the weighed quantity is discharged into the bag thereon; separate, vertically movable switch gates arranged at the junction of the chute branches to divert the material from one chute to the other; cut-off gates adjacent to the ends of the chute branches; and means automatically to operate said switch gates and cut-off gates upon the descent of the respective platforms.

7. In an automatic weighing and container filling machine of the character described, an inclined chute having a pair of branches at the discharge end; container supporting platforms below the branches; weighing mechanism suspending the supporting platforms; separate inter-connected switch gates arranged at the junction of the chute branches to divert the material from one chute to the other; cut-off gates adjacent to the ends of the chute branches; and common means for operating said switch gates and cut-off gates upon the descent of the respective platforms.

8. In an automatic weighing and container filling machine of the character described, an inclined chute having a pair of branches at the discharge end; supporting platforms below the branches; weighing mechanism suspending the bag supporting platforms including latch means connected to release the respective platforms to descend when the weighed quantity is discharged thereon; separate switch gates arranged at the junction of the chute branches to divert the material from one chute to the other; cut-off gates adjacent to the ends of the chute branches; and links and levers connected to operate the respective pairs of switch gates and cut-off gates simultaneously incident to the descent of the respective platforms.

9. In an automatic weighing and bagging machine of the character described, an inclined chute having a pair of branches at the discharge end; bag supporting platforms below the branches; weighing mechanism suspending the bag supporting platforms; switch gates arranged at the junction of the chute branches to divert the material from one chute to the other; cut-off gates adjacent to the ends of the chute branches; said switch gates and cut-off gates being constructed and arranged to rise above the bottom of the chute and the branches through the material therein; and operating mechanism to raise a switch gate and cut-off gate for one branch incident to the descent of the respective platform.

10. In an automatic weighing and bagging machine of the character described, a chute having a pair of inclined branches; movable bag supporting platforms below the branches; independent weighing mechanism for the respective platforms; switch gates below the chute and adapted to be projected upwardly therethrough to divert material from one branch to the other; cut-off gates for the branches also arranged to rise from below the branches; means to raise the respective switch gates incident to the descent of the platforms; and associated means for closing the cut-off gates with substantially a snap action when the switch gates are operated.

11. In a bag weighing and filling machine of the character described, an inclined chute having a pair of branches; bag supporting platforms arranged below the branches; weighing mechanisms for the platforms; pairs of gates for each branch, one gate arranged to divert material to the other branch and the other gate arranged to close with a snap action when a weighed quantity of material is discharged into a bag; and means operable by the platforms to raise and lower said gates.

12. In an automatic weighing and filling machine of the character described, a chute having branches; a pair of container supporting platforms below the branches; a pivoted beam below the bag supporting platforms arranged to permit one platform to descend and raise or balance the other platform; spring bail members secured to said platforms; bag holding arms on said bail members; weighing levers pivoted above said branches; pivoted scale beams associated with the levers; and means for locking the weighing levers to support the platforms in elevated positions until a predetermined weight of the material is discharged therein and arranged to be released when the scale beams are operated.

13. In a bag weighing and filling machine of the character described, an inclined chute having a pair of open branches; a pair of container-supporting platforms below the branches; weighing means suspending the platforms including weighted latch levers connected to release the platforms whereby one of the platforms will descend automatically when a predetermined weight is discharged in a container; separate, vertically movable material cut-off means pivotally mounted below each of the chute branches; and means operable by the respective platforms to actuate the cut-off means.

14. An automatic weighing and filling machine of the character described, a chute having branches; a pair of platforms supported below the branches; weighing levers supporting the platforms; scale beams arranged adjacent to the opposite sides of said chute; pivoted latches on the scale beams engageable with said weighing levers; means permitting said levers to be locked automatically by said latches when the respective platforms are elevated to container filling position; and guiding means to constrain the weighing levers to move in the path of said latches.

15. In an automatic weighing and filling machine of the character described, a chute having a pair of branches; a pair of supporting platforms below the branches; weighing means suspending the respective platforms; means for locking the weighing mechanism to support the respective platforms in filling position until a predetermined weight has been discharged into the bags; under-slung gates for the chute and arranged to cut off and divert the material from one branch to the other; operating arms supporting said gates and mounted on a rocker arm; pivotally mounted rods cooperating with said rocker arm; and arms on said rods arranged below said supporting platforms to be actuated upon the descent of said platforms and thereby raise the respective gates.

16. In combination with an automatic weighing and container filling machine, an inclined chute having a pair of branches and under-shot gates for said branches to divert material from one branch to the other.

17. In an automatic weighing and filling machine of the character described, an inclined chute having a pair of open branches; under-shot cut-off gates pivotally mounted below the discharge ends of said branches and adapted to open by gravity; and lever means associated with the weighing mechanism to raise said gates and close the chutes.

In testimony that I claim the foregoing as my own, I have hereto affixed my signature.

ANDREW TROVATON.